(12) United States Patent
Bonk (10) Patent No.: US 6,910,738 B2
(45) Date of Patent: Jun. 28, 2005

(54) DEVICE AND METHOD FOR ASSEMBLING A RECLINER MECHANISM

(75) Inventor: Jeffery T. Bonk, Clinton Township, MI (US)

(73) Assignee: Fisher Dynamics Corporation, St. Clair Shores, MI (US)

(*) Notice: Subject to any disclaimer, the term of this patent is extended or adjusted under 35 U.S.C. 154(b) by 0 days.

(21) Appl. No.: 10/352,790

(22) Filed: Jan. 28, 2003

(65) Prior Publication Data

US 2004/0145227 A1 Jul. 29, 2004

(51) Int. Cl.$^7$ .................................................. B60N 1/02
(52) U.S. Cl. ........................ 297/367; 297/364; 29/11; 16/325; 16/345; 74/577 R
(58) Field of Search ................................ 297/374, 363, 297/364, 366–369; 16/325, 343–351; 29/11; 74/144–169, 577 R–578

(56) References Cited

U.S. PATENT DOCUMENTS

| 775 | A | | 6/1838 | Carver |
|---|---|---|---|---|
| 289,653 | A | | 12/1883 | Haynes |
| 2,195,261 | A | * | 3/1940 | Rasmussen et al. ..... 188/79.63 |
| 2,941,583 | A | | 6/1960 | Tischler et al. |
| 3,479,088 | A | * | 11/1969 | Michel ....................... 297/373 |
| 3,641,838 | A | | 2/1972 | Turner |
| 3,663,056 | A | | 5/1972 | Turner |
| 3,737,946 | A | | 6/1973 | Guiliani |
| 3,879,802 | A | | 4/1975 | Werner |
| 4,076,309 | A | * | 2/1978 | Chekirda et al. ........... 297/363 |
| 4,082,352 | A | | 4/1978 | Bales et al. |
| 4,085,969 | A | | 4/1978 | Nakane et al. |
| 4,087,885 | A | | 5/1978 | Gillentine |
| 4,103,970 | A | | 8/1978 | Homier |
| 4,133,578 | A | * | 1/1979 | Fancy ........................ 297/370 |
| 4,143,905 | A | | 3/1979 | Hensel et al. |
| 4,143,912 | A | * | 3/1979 | Kramer ....................... 297/362 |
| 4,348,050 | A | | 9/1982 | Letournoux et al. |
| 4,384,744 | A | * | 5/1983 | Barley ........................ 297/367 |
| 4,709,965 | A | | 12/1987 | Kazaoka et al. |
| 4,767,158 | A | | 8/1988 | Satoh |
| 4,770,464 | A | | 9/1988 | Pipon et al. |
| 4,884,845 | A | | 12/1989 | Schmale et al. |
| 4,997,223 | A | | 3/1991 | Croft |
| 5,161,856 | A | | 11/1992 | Nishino |
| 5,301,569 | A | | 4/1994 | Droulon |
| 5,322,346 | A | * | 6/1994 | Notta et al. ................. 297/367 |
| 5,486,036 | A | * | 1/1996 | Ito et al. ..................... 297/339 |
| 5,507,553 | A | | 4/1996 | Nishizawa et al. |
| 5,540,117 | A | * | 7/1996 | Hansel et al. ........... 74/577 SF |
| 5,558,402 | A | | 9/1996 | Yamada |
| 5,590,931 | A | | 1/1997 | Fourrey et al. |
| 5,600,876 | A | * | 2/1997 | Notta et al. ..................... 29/11 |
| 5,611,599 | A | | 3/1997 | Baloche et al. |
| 5,622,407 | A | | 4/1997 | Yamada et al. |

(Continued)

FOREIGN PATENT DOCUMENTS

FR       2 578 602       9/1986

*Primary Examiner*—Eric Compton
(74) *Attorney, Agent, or Firm*—Harness, Dickey & Pierce, P.L.C.

(57) ABSTRACT

An adjustable pivot rotatably supports and adjusts a position of a pivoting member within a housing. The adjustable pivot includes a central cylinder defining a first axis and rotatably supporting the pivoting member. A second cylinder extends from the central cylinder and defines a second axis offset from and parallel to the first axis. The second cylinder is supported by the housing and operable for rotation about the second axis to an adjustment position. Rotation of the second cylinder to the adjustment position causes the first axis to orbit about the second axis to an adjusted position. In this manner, the pivoting member is adjustably positioned within the housing.

20 Claims, 7 Drawing Sheets

U.S. PATENT DOCUMENTS

| | | | |
|---|---|---|---|
| 5,632,525 A | 5/1997 | Uramichi | |
| 5,664,836 A | 9/1997 | Takagi | |
| 5,664,837 A | 9/1997 | Takagi | |
| 5,664,838 A | 9/1997 | Baloche | |
| 5,678,895 A | 10/1997 | Matsuura et al. | |
| 5,681,086 A | 10/1997 | Baloche | |
| 5,692,589 A | 12/1997 | Beguin | |
| 5,709,133 A | 1/1998 | Coggon et al. | |
| 5,718,483 A | * 2/1998 | Yamaguchi et al. | 297/367 |
| 5,725,452 A | 3/1998 | Droulon et al. | |
| 5,749,624 A | 5/1998 | Yoshida | |
| 5,755,491 A | 5/1998 | Baloche et al. | |
| 5,762,400 A | 6/1998 | Okazaki et al. | |
| 5,769,494 A | 6/1998 | Barrere et al. | |
| 5,779,313 A | 7/1998 | Rohee | |
| 5,785,386 A | 7/1998 | Yoshida | |
| 5,788,325 A | 8/1998 | Ganot | |
| 5,813,724 A | 9/1998 | Matsuura et al. | |
| 5,816,656 A | 10/1998 | Hoshihara et al. | |
| 5,820,218 A | 10/1998 | Baloche et al. | |
| 5,820,219 A | 10/1998 | Rohee | |
| 5,857,746 A | 1/1999 | Barrere et al. | |
| 5,871,414 A | 2/1999 | Voss et al. | |
| 5,873,630 A | 2/1999 | Yoshida et al. | |
| 5,881,854 A | 3/1999 | Rougnon-Glasson | |
| 5,884,972 A | 3/1999 | Deptolla | |
| 5,934,753 A | 8/1999 | Lange | |
| 5,984,413 A | 11/1999 | Baloche et al. | |
| 5,997,090 A | 12/1999 | Baloche et al. | |
| 6,003,945 A | 12/1999 | Kojima | |
| 6,007,152 A | 12/1999 | Kojima et al. | |
| 6,007,153 A | 12/1999 | Benoit et al. | |
| 6,019,430 A | 2/2000 | Magyar et al. | |
| 6,023,994 A | 2/2000 | Yoshida | |
| 6,039,400 A | 3/2000 | Yoshida et al. | |
| 6,082,821 A | 7/2000 | Baloche et al. | |
| 6,085,386 A | 7/2000 | Blanchard et al. | |
| 6,092,874 A | 7/2000 | Kojima et al. | |
| 6,095,608 A | 8/2000 | Ganot et al. | |
| 6,102,480 A | 8/2000 | Asano | |
| 6,112,370 A | 9/2000 | Blanchard et al. | |
| 6,120,098 A | 9/2000 | Magyar et al. | |
| 6,142,569 A | 11/2000 | Kidokoro et al. | |
| 6,149,235 A | 11/2000 | Fahim | |
| 6,164,723 A | 12/2000 | Ganot | |
| 6,178,596 B1 | 1/2001 | Choi | |
| 6,220,666 B1 | 4/2001 | Ohya | |
| 6,224,157 B1 | 5/2001 | Di Luccio | |
| 6,253,894 B1 | 7/2001 | Schumann et al. | |
| 6,283,886 B1 | 9/2001 | Schumann | |
| 6,312,053 B1 | 11/2001 | Magyar | |
| 6,318,805 B1 | 11/2001 | Asano | |
| 6,325,458 B1 | 12/2001 | Rohee et al. | |
| 6,328,382 B1 | 12/2001 | Yamashita | |
| 6,328,383 B2 | 12/2001 | Rohee et al. | |
| 6,332,647 B1 | 12/2001 | Yoshida et al. | |
| 6,332,649 B1 | 12/2001 | Vossmann | |
| 6,338,532 B1 | 1/2002 | Sugimoto | |
| 6,364,413 B1 | 4/2002 | Rohee et al. | |
| 6,390,557 B1 | 5/2002 | Asano | |
| 6,402,249 B1 | 6/2002 | Rohee et al. | |
| 6,439,663 B1 | 8/2002 | Ikegaya | |
| 6,454,354 B1 | 9/2002 | Vossmann et al. | |
| 6,464,298 B1 | 10/2002 | Hansel et al. | |
| 6,474,740 B1 | 11/2002 | Kondo et al. | |
| 6,488,338 B1 | 12/2002 | Hoshihara | |
| 2001/0001220 A1 | 5/2001 | Rohee et al. | |
| 2002/0000746 A1 | 1/2002 | Matsuura et al. | |
| 2002/0017811 A1 | 2/2002 | Cilliere et al. | |
| 2002/0024246 A1 | 2/2002 | Yamada et al. | |
| 2002/0033627 A1 | 3/2002 | Hoshihara et al. | |
| 2002/0041119 A1 | 4/2002 | Kojima et al. | |
| 2002/0043852 A1 | 4/2002 | Uramichi | |
| 2002/0043855 A1 | 4/2002 | Lange | |
| 2002/0043856 A1 | 4/2002 | Ikegaya | |
| 2002/0050732 A1 | 5/2002 | Koga et al. | |
| 2002/0053825 A1 | 5/2002 | Reubeuze et al. | |
| 2002/0070596 A1 | 6/2002 | Nonomiya et al. | |
| 2002/0096922 A1 | 7/2002 | Villaroel et al. | |
| 2002/0096923 A1 | 7/2002 | Uramichi | |
| 2002/0096924 A1 | 7/2002 | Reubeuze | |
| 2002/0096925 A1 | 7/2002 | Uramichi | |

* cited by examiner

DEVICE AND METHOD FOR ASSEMBLING A RECLINER MECHANISM

FIELD OF THE INVENTION

The present invention relates to relates generally to recliner mechanisms and, more particularly, to a device and method for assembling a recliner mechanism.

BACKGROUND OF THE INVENTION

Rotary recliner mechanisms generally include of a first rotary member having a plurality of teeth and a second rotary member including one or more pawls adapted to lockingly engage the teeth to couple the rotary members to one another. Typically, one rotary member is mounted to a quadrant for attachment to a seat back and the second rotary member is mounted to a base plate for attachment to a seat base. The rotary recliner mechanisms are operable to lock the rotary member connected to the seat back to restrict its rotation, or to release the rotary member connected to the seat back to allow it to rotate and to enable the seat back to recline.

The rotary recliner mechanism is selectively locked or released by manipulating the one or more pawls, which are mounted for rotation between an engaged position where the teeth of the pawl and the teeth of the rotary member connected to the seat base mesh, and a disengaged position where the pawl retracts and no longer meshes with the teeth of the rotary member connected to the seat base. Locking rotary recliner mechanisms also may include a device, such as a spring, for releasably urging the pawl from the disengaged to the engaged position so that the default position for the mechanism is a locked condition. Further, the rotary recliner typically includes an activating mechanism that moves the pawl from the engaged position to the disengaged position.

In reclining seats, the seat back functions as an extremely long lever arm against which various forces are applied. The locking rotary recliner mechanism in a vehicle seat is relatively small compared to the length of the reclining seat back, and vehicle vibration or movement of an occupant may impose various forces upon that lever during use. These forces impose a large moment about the rotary member connected to the seat back when applied along such a lengthy lever arm. Any imperfection in the components of the pivot mechanisms, such as play or backlash between the engaging teeth or tolerances between the mechanism components, may allow the rotary member connected to the seat back to move a minuscule amount even when the mechanism is locked. These small movements are magnified by the length of the lever arm and become noticeable at the upper end of the seat. This magnified play in locking pivot mechanisms has been termed "chucking" and refers to any imperfections or play in the mechanism components that allow movement of the rotary member and attached seat back while the mechanism is in a locked condition.

One technique employed to reduce chucking is to form the components of the pivot mechanism with exceedingly close tolerances. Manufacturing to such close tolerance is difficult and expensive because precision machining is required. Further, close tolerances may bind the components of the system and prevent smooth operation.

SUMMARY OF THE INVENTION

The present invention provides an adjustable pivot to rotatably support and adjust a position of a pivoting member within a housing. The adjustable pivot includes a central cylinder defining a first axis and rotatably supporting the pivoting member. A second cylinder extends from the central cylinder and defines a second axis offset from and parallel to the first axis. The second cylinder is supported by the housing and operable for rotation about the second axis to an adjustment position. Rotation of the second cylinder to the adjustment position causes the first axis to orbit about the second axis to an adjusted position. In this manner, the pivoting member is adjustably positioned within the housing.

In one feature, the adjustable pivot further includes a third cylinder extending from the central cylinder. The third cylinder defines a third axis aligned with the second axis. The third cylinder is supported by the housing.

In another feature, rotation of the third cylinder about the third axis induces orbiting of the first axis about the third axis to adjust a position of the pivotal member within the housing.

In still another feature, the adjustable pivot further includes a relief formed in a face of the second cylinder. The relief is engageable by a tool to induce rotation of the second cylinder.

In yet another feature, the second cylinder is staked in the adjusted position to the housing to prohibit rotation of the second cylinder about the second axis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Referring to FIGS. 1 through 7, an exemplary compact recliner assembly 10 includes an outer housing 12 having a support plate 14 fixed thereto, and an inner housing 16 supported within the outer housing 12 and covered by a cover plate 18. The inner housing 16 supports a locking pawl 20 and a pair of locking cams 22. The locking pawl 20 is slidable between a locked position, engaging an inner circumferential surface 24 of the outer housing 12, and an unlocked position, disengaging the inner circumferential surface 24. The locking cams 22 are movable between locked and unlocked positions (see FIGS. 4 and 6, respectively) to correspondingly lock the locking pawl 20 in its locked position.

Figure 1:
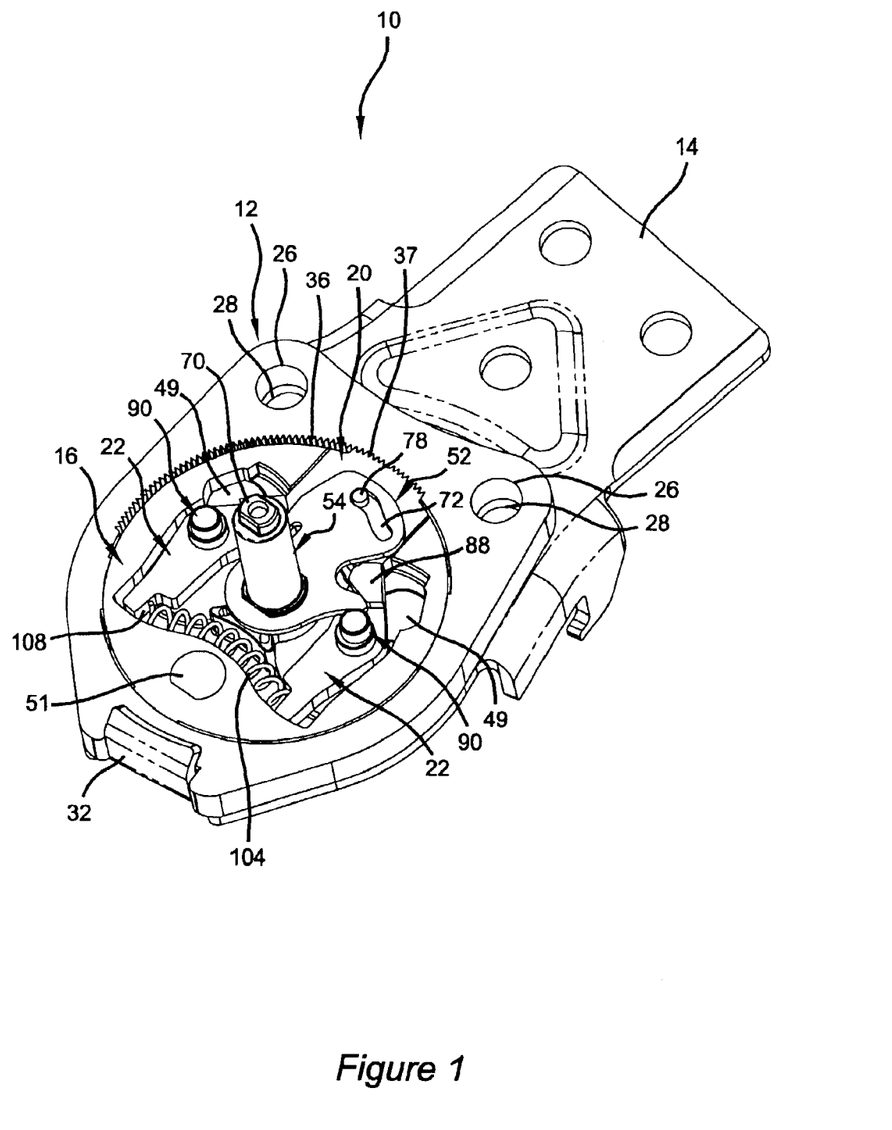
FIG. 1 is a perspective view of an exemplary compact recliner assembly according to the present invention.
Figure 2:
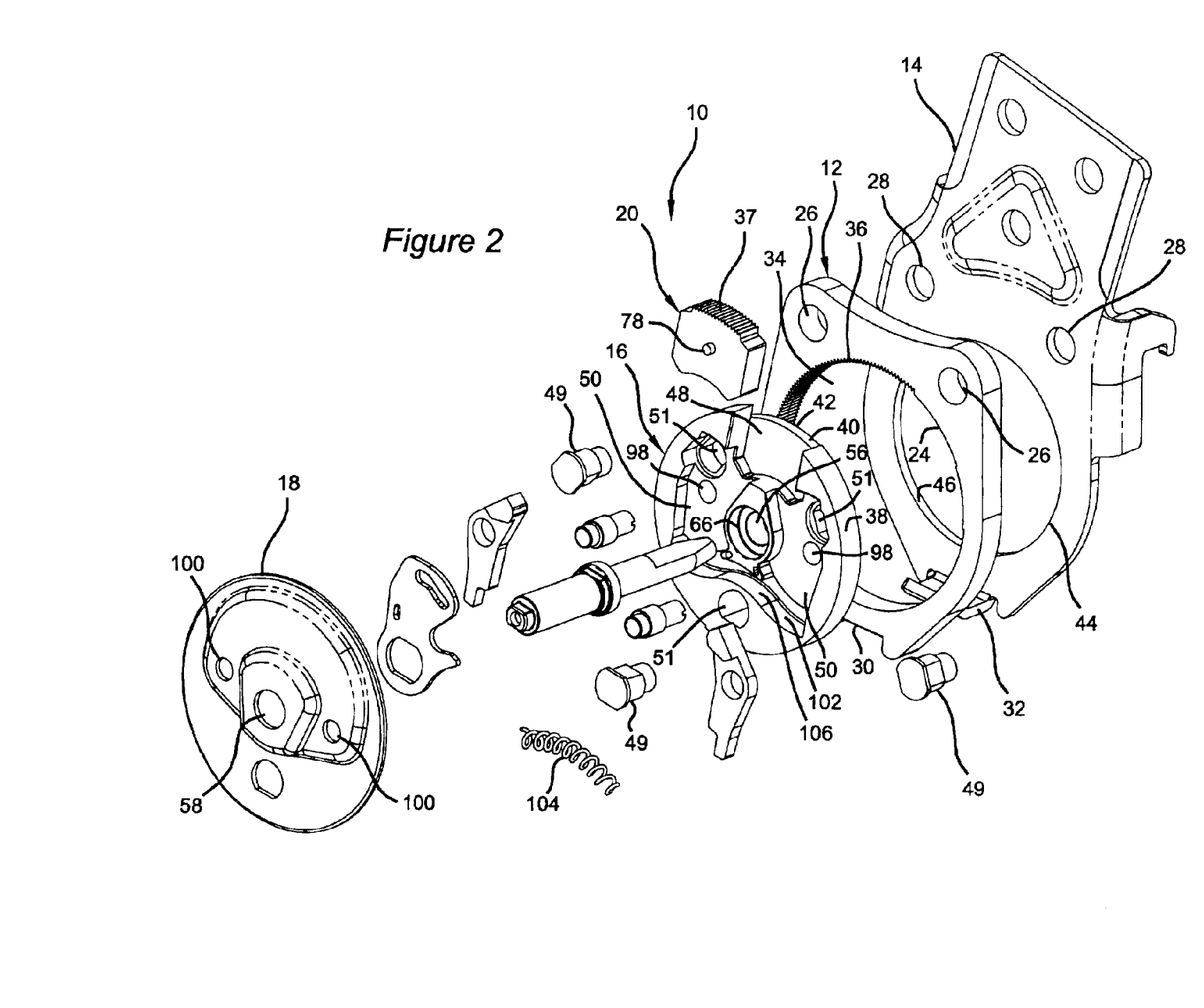
FIG. 2 is an exploded view of the exemplary compact recliner assembly.
Figure 3:
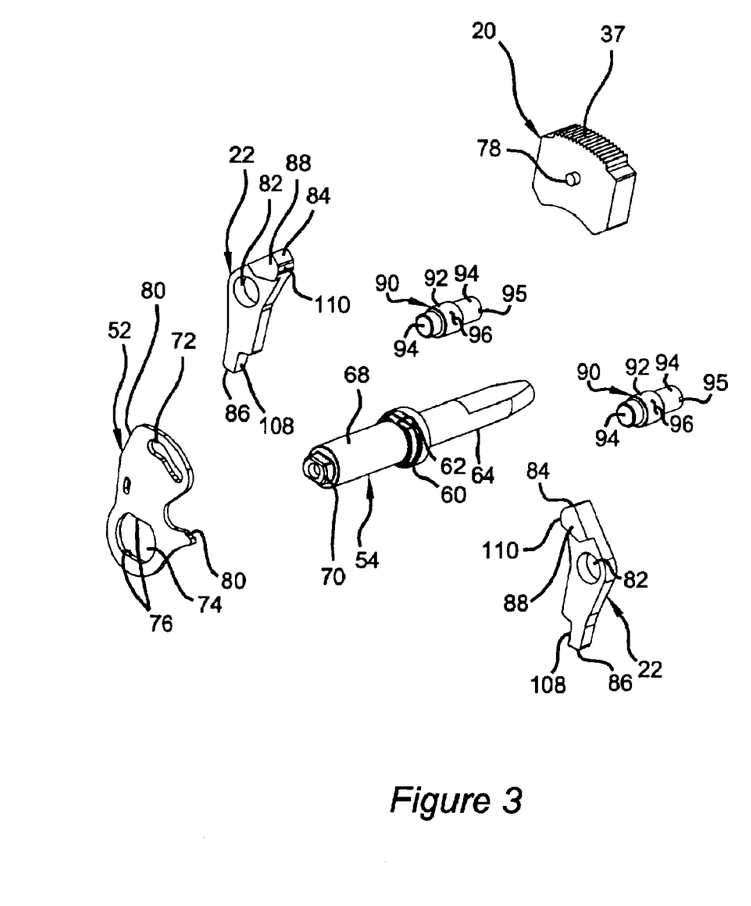
FIG. 3 is an exploded view of locking components of the exemplary compact recliner assembly.

The outer housing 12 is fixed to the support plate 14 by fasteners (not shown) that are received through apertures 26 of the outer housing 12 and apertures 28 of the support plate 14. A lower flat 30 of the outer housing 12 seats within a bracket 32 extending from the support plate 14. The outer housing 12 includes an oversized aperture 34 that forms the inner circumferential surface 24. A series of teeth 36 are formed in a section of the inner circumferential surface 24. Teeth 37 of the locking pawl 20 selectively engage the teeth 36.

The inner housing 16 seats within the aperture 34 of the outer housing 12 and includes an outer circumferential surface 38. The outer circumferential surface 38 slidably engages the inner circumferential surface 24 of the outer housing. In this manner, the outer housing 12 is rotatably supported about the inner housing 16. The inner housing 16 also includes a cylindrical extension 40 that defines an outer circumferential surface 42. The cylindrical extension 40 is received into an aperture 44 of the support plate 14 that defines an inner circumferential surface 46. The outer circumferential surface 42 and the inner circumferential surface 46 are slidably engaged to support the support plate 14 about the inner housing 16. The inner housing 16 includes a pawl slot 48 and cam recesses 50 formed therein.

The inner housing 16 is anchored in a fixed position by anchors 49. The anchors 49 are received through apertures 51 and are secured to a fixed structure (not shown) by bolts (not shown). In this manner, the inner housing 16 is fixed relative to the support structure and the outer housing 12 is rotatable about the fixed inner housing 16.

A cam plate 52 is rotatably supported within the inner housing 16 and engages the locking pawl 20 and the locking cams 22 for moving each between the locked and unlocked positions. The cam plate 52 is supported about a pivot 54 that extends through a central aperture 56 of the inner housing 16 and a central aperture 58 of the cover plate 18. The pivot 54 includes a central cylindrical section 60 having a step with keyed surfaces 62. A tapered cylindrical section 64 extends through and is supported within the central aperture 56 of the inner housing 16. The central cylindrical section 60 seats within a recess 66 of the central aperture 56. A cylindrical section 68 extends through and is supported within the central aperture 58 of the cover plate 18. A keyed section 70 extends from an end of the cylindrical section 68.

The cam plate 52 includes a cam slot 72 and a central aperture 74 having keyed flats 76 formed therein. A post 78 of the locking pawl 20 is received into the cam slot 72 and is slidable therein. The pivot 54 is received through the central aperture 74, whereby the keyed surfaces 62 engage the keyed flats 76 of the central aperture 74. In this manner, the cam plate 52 is fixed for rotation with the pivot 54. The cam plate 52 further includes engagement edges 80 that slidably engage the locking cams 22.

Figure 5:
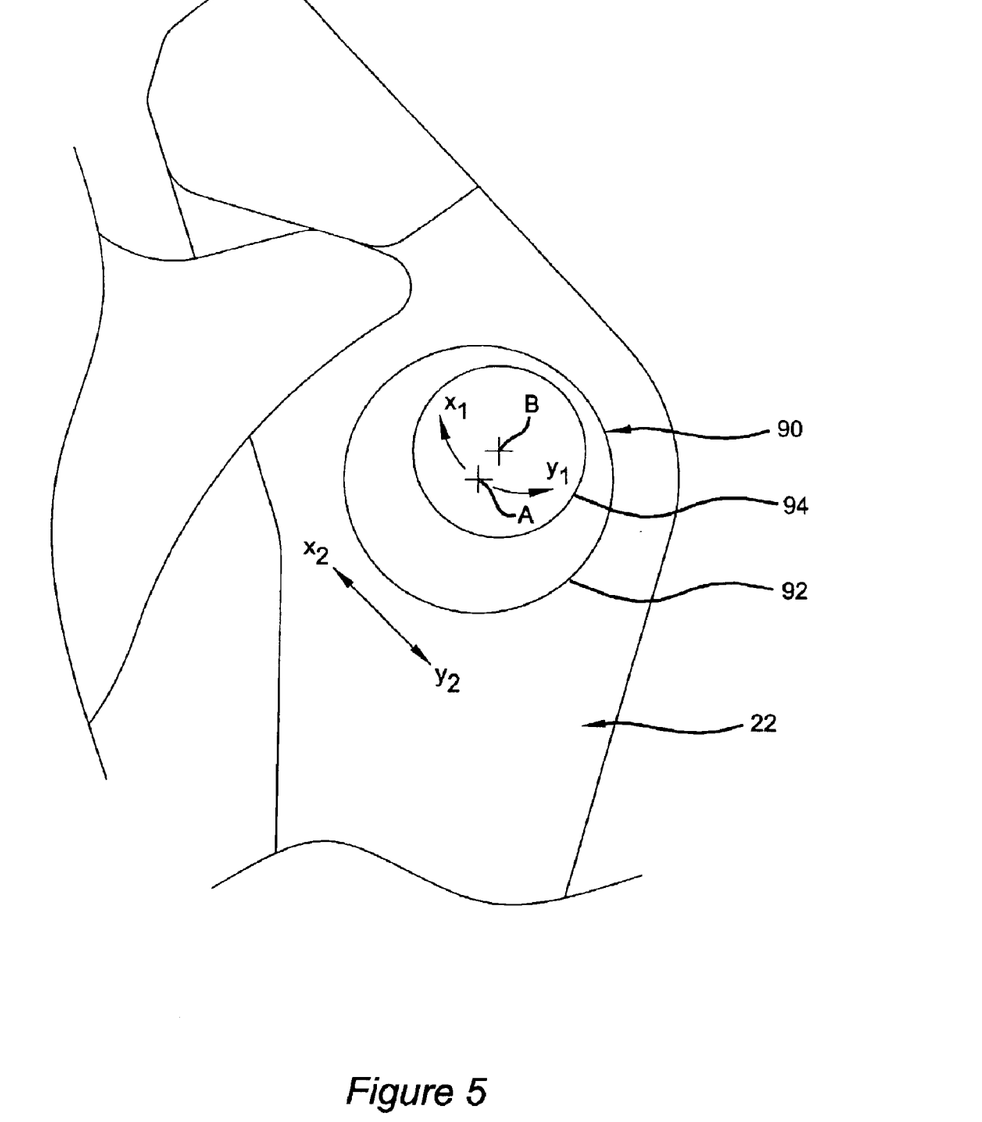
FIG. 5 is a detailed view of an adjustable pivot of the compact recliner assembly.

The locking cams 22 include a central aperture 82, an upper jamming edge 84, a lower jamming edge 86, and a raised surface 88. The locking cams 22 are pivotally supported within the cam recesses 50 about adjustable pivots 90. The pivots 90 each include a central cylindrical section 92 defining an axis A and extending cylindrical sections 94 defining an axis B. As best seen in FIG. 5, the central cylindrical section 92 is concentrically offset from the extending cylindrical sections 94. In other words, axis A is offset from axis B. A groove 95 is formed at an end of the extending cylindrical sections 94. The central cylindrical section 92 is received through the aperture 82 of the locking cam 22 and includes a bearing surface 96 about which the locking cam 22 is rotatably supported. The extending cylindrical sections 94 are received through apertures 98, 100 of the inner housing 16 and cover plate 18, respectively, to support the pivot 90 therebetween.

Figure 4:
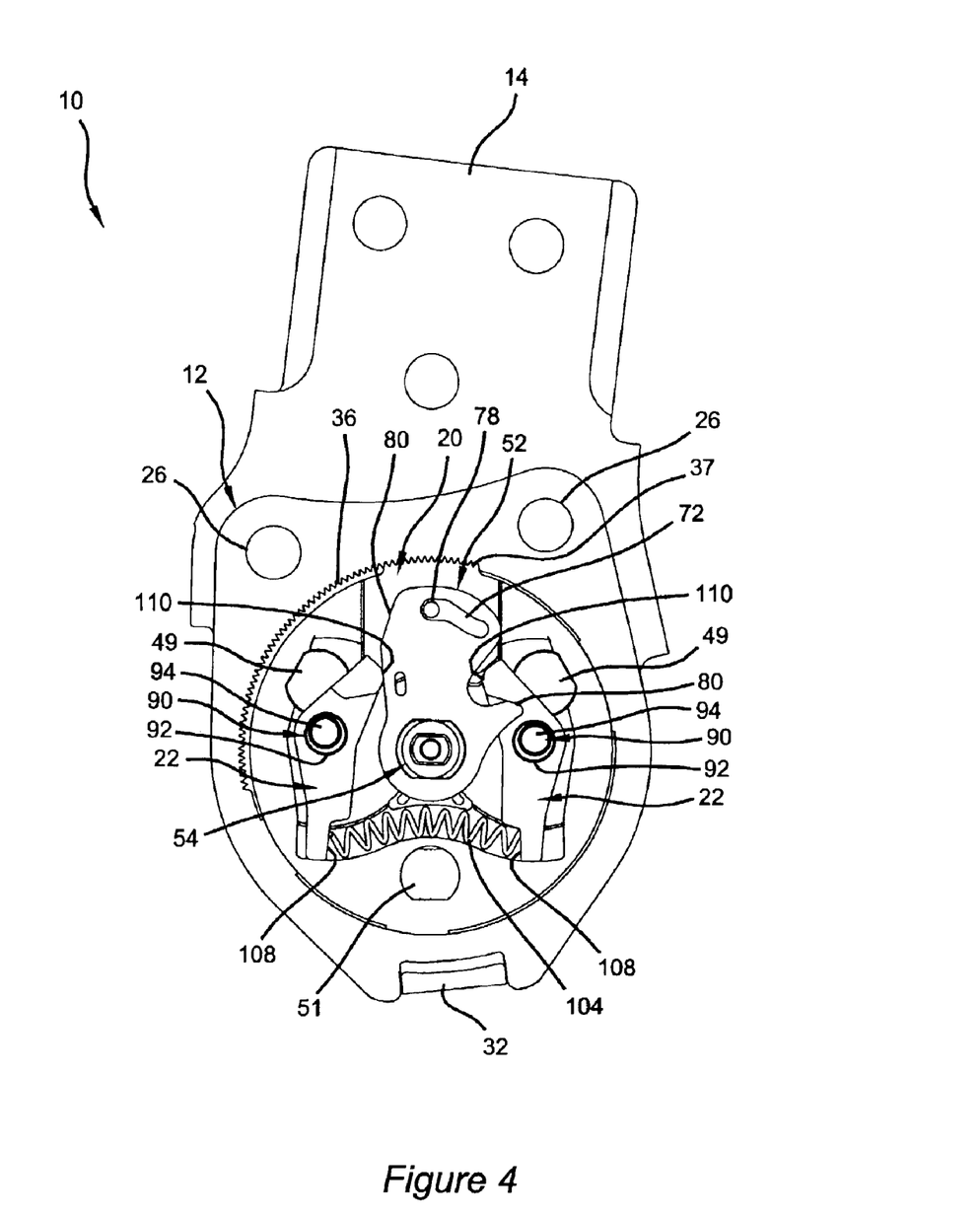
FIG. 4 is a plan view of the exemplary compact recliner assembly in a locked position.
Figure 6:
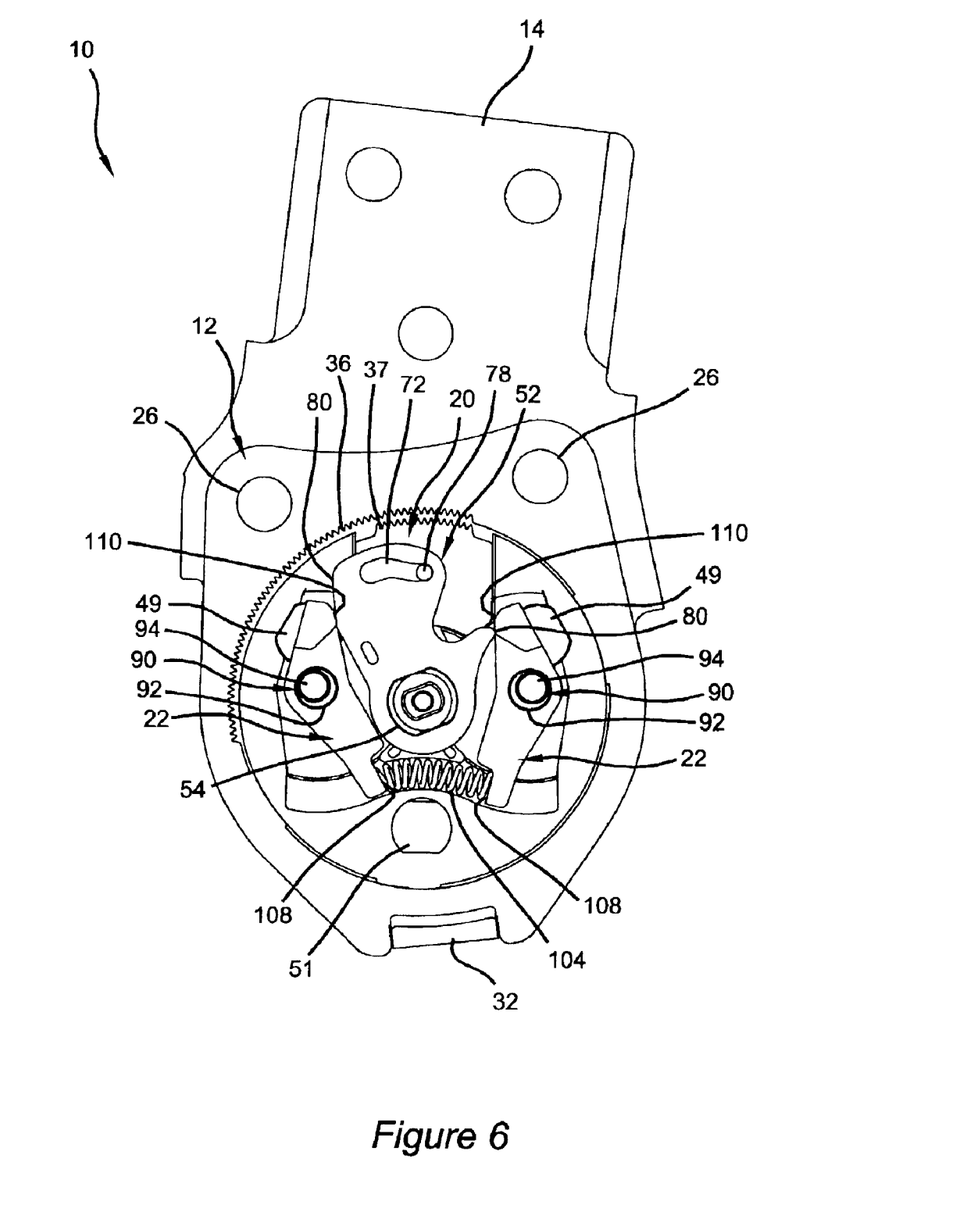
FIG. 6 is a plan view of the exemplary compact recliner assembly in an unlocked position.
Figure 7:
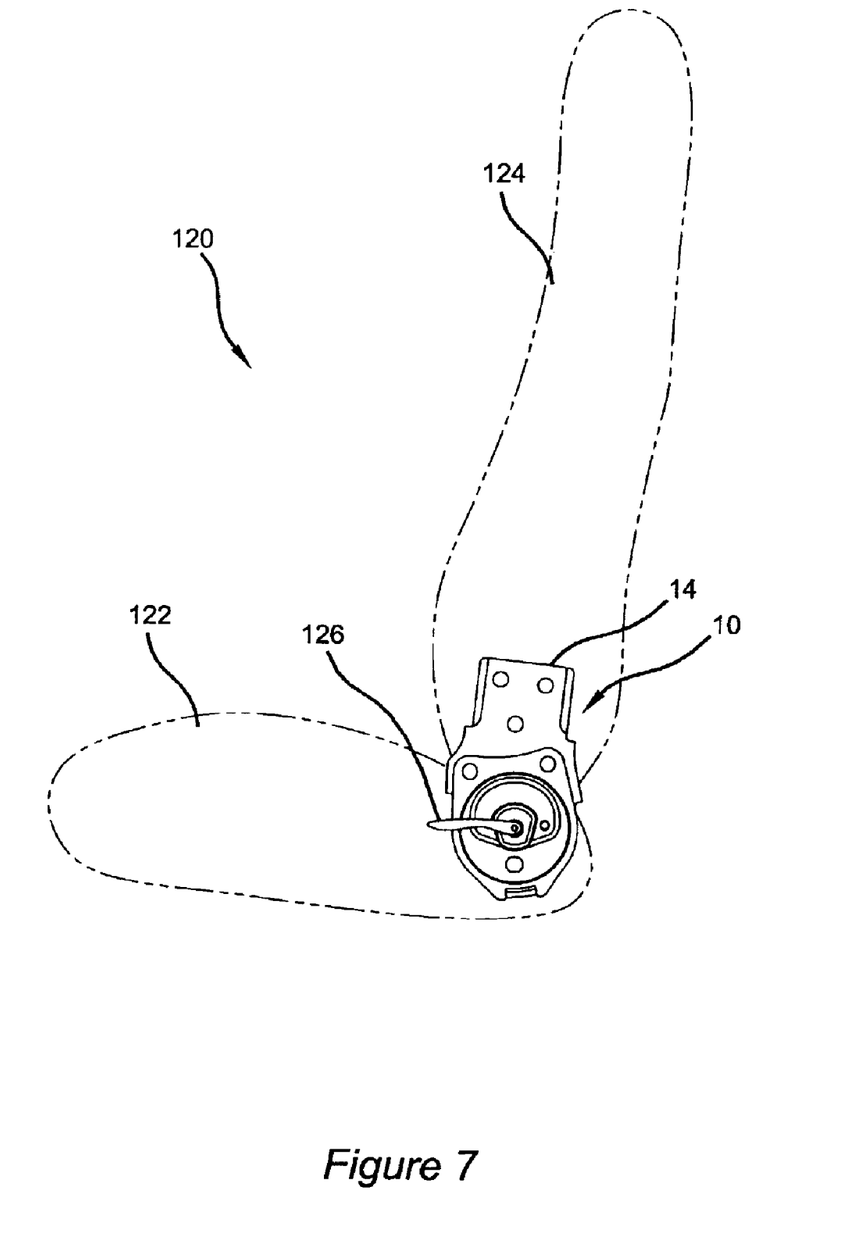
FIG. 7 is a schematic view of a seat incorporating the exemplary compact recliner assembly.

In the locked position the locking cams 22 act as columns biasing the locking pawl 20 into engagement with the inner circumferential surface 24. The upper jamming edges 84 of the locking cams 22 engage the locking pawl 20 and the lower jamming edges 86 engage a surface 102 of the inner housing 16. In this manner, the locking cams 22 prohibit inward radial sliding of the locking pawl 20. In the unlocked position the locking cams 22 are dislocated from engagement with the locking pawls 20 and surface 102 to enable the inward radial sliding of the locking pawl 20.

During assembly, tolerances between the locking cams 22 are minimized to ensure the locking cams 22 properly contact the locking pawl 20 and the surface 102 when in the locked position. The locking pawl 20 and locking cams 22 are set in the locked position. This position is deemed neutral and it is relative to this position that the locking cams 22 are moved to an adjusted position to minimize tolerances. To minimize tolerances, the relative positions of the locking cams 22 between the locking pawl 20 and the surface 102 are adjusted by rotating the pivots 90 within the apertures 98,100. Rotation of the pivots 90 is induced inserting a flat-head tool (e.g., screwdriver) into the grooves 95. Rotation of the pivots 90 within the apertures 98,100 induces the axis A to orbit axis B in directions $X_1$ or $Y_1$. The central cylindrical sections 92 rotate within apertures 82 of the locking cams 22. Movement of axis B about axis A induces planar movement of the locking cams 22 within the inner housing 16 to an adjusted position. The locking cams 22 move in directions $X_2$ and $Y_2$ to adjust the locking cams 22 between the locking pawl 20 and the surface 102. Once the adjusted position of the locking cams 22 is achieved, the pivots 90 are staked to the inner housing 16 and the cover plate 18. In this manner, the pivots 94 are fixed from rotating after assembly, thereby fixing the position of the locking cams 22 between the locking pawl 20 and the surface 102.

The locking cams 22 are biased into the locked position by a compression spring 104. The compression spring 104 seats within a spring recess 106 partially defined by the surface 102. The compression spring 104 seats between flats 108 of the locking cams 22 to exert a biasing force on the locking cams 22. The engagement edges 80 of the cam plate 52 slidably engage corresponding edges 110 of the raised surfaces 88. As the cam plate 52 is induced to rotate, the engagement edges 80 bias the locking cams 22 to rotate about the pivots 90 to the unlocked position. As the locking cams 22 rotate, the flats 108 compress the compression spring 104. Upon release of the cam plate 52, the compression spring 104 biases the locking cams 22 into the locked position. As the locking cams 22 rotate back to the locked position the cam plate 52 is induced to rotate, urging the locking pawl 20 back into engagement with the teeth 36 of the inner circumferential surface 24.

Referring now to FIG. 6, the compact recliner assembly 10 is integrated into a seat assembly 120. The seat assembly 120 includes a seat 122 and a seat back 124. The inner housing 16 is fixed to the seat 122 by the anchors 49. The seat back 124 is fixed to the support plate 14. Rotation of the outer housing 12 about the inner housing 16 facilitates corresponding pivoting of the seat back 124 relative to the seat 122. A handle 126 is fixed to the keyed section 70 of the pivot 54. The handle 126 is actuated by an operator to induce rotation of the pivot 54, thereby facilitating operation of the compact recliner assembly 10 as described above.

It is appreciated that the compact recliner assembly 10 is merely exemplary in nature and is only one example of many types of recliner assemblies known in the art. It is anticipated that the adjustable pivots 90 can be implemented in any type of recliner assembly. Implementation of an adjustable pivot reduces chucking by compensating for tolerances between recliner assembly components.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A compact recliner assembly comprising:
    a housing including a first housing portion and a second housing portion, said second housing portion rotatably supported about said first housing portion;
    a lock pawl slidably received in a slot formed in said first housing portion and movable between a locked position engaging said second housing portion adjacent to said slot to restrict rotation of said second housing portion relative to said first housing portion and an unlocked position disengaged from said second housing portion to permit rotation of said second housing portion relative to said first housing portion;
    a cam plate rotatably supported by said first housing portion and operable to toggle said lock pawl between said locked position and said unlocked position;
    a first locking cam rotatably supported by said first housing portion and engaged with said cam plate, said first locking cam movable by said cam plate between a first position locking said lock pawl in said locked position and a second position allowing said lock pawl to move to said unlocked position; and
    a first pivot including a first cylinder defining a first axis and a second cylinder extending from said first cylinder and defining a second axis offset and parallel to said first axis, said first cylinder rotatably received by said first housing portion and said second cylinder fixedly attached to said first locking cam;
    wherein rotation of said first cylinder relative to said first housing portion causes said second axis to orbit about said first axis to adjust a position of said first locking cam relative to said first housing portion.

2. The compact recliner assembly of claim 1, wherein said second housing portion includes an aperture defining an inner circumferential surface.

3. The compact recliner assembly of claim 2, wherein said inner circumferential surface includes a plurality of teeth for selective engagement with said lock pawl when said lock pawl is in said locked position.

4. The compact recliner assembly of claim 1, wherein said cam plate includes a cam slot, said cam slot operable to engage said lock pawl to toggle said lock pawl between said locked position and said unlocked position.

5. The compact recliner assembly of claim 1, further including a second locking cam movable by said cam plate between a first position locking said lock pawl in said locked position and a second position allowing said lock pawl to move to said unlocked position.

6. The compact recliner assembly of claim 5, further including a biasing member engaging said first locking cam and said second locking cam, said biasing member operable to bias said first and second locking cams into said first position.

7. A compact recliner assembly comprising:
    a first housing portion having an outer circumferential surface;
    a second housing portion having an aperture defining an inner circumferential surface opposing said outer circumferential surface of said first housing portion, said second housing portion rotatable about said first housing portion;
    a lock pawl slidably supported by said first housing portion between a locked position engaging said second housing portion to restrict rotation of said second housing portion relative to said first housing portion and an unlocked position disengaged from said second housing portion to permit rotation of said second housing portion relative to said first housing portion;
    a first locking cam rotatably supported by said housing and movable between a first position locking said lock pawl in said locked position and a second position allowing said lock pawl to move to said unlocked position; and
    a first pivot including a first cylinder defining a first axis and a second cylinder extending from said first cylinder and defining a second axis offset and parallel to said first axis, said first cylinder rotatably received by said housing and said second cylinder fixedly attached to said first locking cam;
    wherein rotation of said first cylinder relative to said first housing portion causes said second axis to orbit about said first axis to adjust a position of said first locking cam relative to said first housing portion.

8. The compact recliner assembly of claim 7, wherein said inner circumferential surface includes a plurality of teeth for selective engagement with said lock pawl when said lock pawl is in said locked position.

9. The compact recliner assembly of claim 7, wherein said first housing plate includes a recess and a pawl slot, said recess rotatably supporting said first locking cam therein and said pawl slot slidably receiving said lock pawl.

10. The compact recliner assembly of claim 9, wherein said recess includes a lock surface formed opposite said pawl slot, said first locking cam engages said lock surface when said first locking cam is in said first position to prevent translation of said lock pawl within said pawl slot.

11. The compact recliner assembly of claim 7, further including a cam plate rotatably supported by said first housing plate and operable to toggle said lock pawl between said locked position and said unlocked position.

12. The compact recliner assembly of claim 7, further including a second locking cam movable between a first position locking said lock pawl in said locked position and a second position allowing said lock pawl to move to said unlocked position.

13. The compact recliner assembly of claim 12, further including a biasing member engaging said first locking cam and said second locking cam, said biasing member operable to bias said first and second locking cams into said first position.

14. A compact recliner assembly comprising:
    a first housing portion having a slot formed therein;
    a second housing portion circumferentially surrounding said first housing plate and rotatable relative thereto;

a lock pawl slidably supported within said slot between a locked position engaging said second housing portion to restrict rotation of said second housing portion relative to said first housing portion and an unlocked position disengaged from said second housing portion to permit rotation of said second housing portion relative to said first housing portion;

a first locking cam rotatably supported by said housing and movable between a first position locking said lock pawl in said locked position and a second position allowing said lock pawl to move to said unlocked position; and a first pivot including a first cylinder defining a first axis and a second cylinder extending from said first cylinder and defining a second axis offset and parallel to said first axis, said first cylinder rotatably received by said housing and said second cylinder fixedly attached to said first locking cam;

wherein rotation of said first cylinder relative to said first housing portion causes said second axis to orbit about said first axis to adjust a position of said first locking cam relative to said first housing portion.

15. The compact recliner assembly of claim 14, wherein said second housing plate includes a plurality of teeth for selective engagement with said lock pawl when said lock pawl is in said locked position.

16. The compact recliner assembly of claim 14, wherein said first housing plate further includes a recess rotatably supporting said first locking cam therein.

17. The compact recliner assembly of claim 16, wherein said recess includes a lock surface formed opposite said slot, said first locking cam engaging said lock surface when said first locking cam is in said first position to prevent translation of said lock pawl within said pawl slot.

18. The compact recliner assembly of claim 14, further including a cam plate rotatably supported by said first housing plate and operable to toggle said lock pawl between said locked position and said unlocked position.

19. The compact recliner assembly of claim 14, further including a second locking cam movable between a first position locking said lock pawl in said locked position and a second position allowing said lock pawl to move to said unlocked position.

20. The compact recliner assembly of claim 19, further including a biasing member engaging said first locking cam and said second locking cam, said biasing member operable to bias said first and second locking cams into said first position.

* * * * *